United States Patent [19]
Crites

[11] 3,892,616
[45] July 1, 1975

[54] INDEX MEANS FOR TIRE-BUILDING APPARATUS

[75] Inventor: Robert G. Crites, Ravenna, Ohio

[73] Assignee: The General Tire & Rubber Company, Akron, Ohio

[22] Filed: Apr. 5, 1974

[21] Appl. No.: 458,157

Related U.S. Application Data

[63] Continuation of Ser. No. 233,695, March 10, 1972, abandoned.

[52] U.S. Cl. ............... 156/352; 156/123; 156/132; 156/400; 156/405; 156/417
[51] Int. Cl. ........................................... B29h 17/20
[58] Field of Search ........... 156/414, 406, 405, 402, 156/400, 398, 397, 379, 368, 352, 117, 133, 127, 126, 364

[56] References Cited
UNITED STATES PATENTS

| | | | |
|---|---|---|---|
| 3,070,478 | 12/1962 | Riddle | 156/126 |
| 3,325,072 | 6/1967 | Black et al. | 156/405 |
| 3,442,746 | 5/1969 | Robertson | 156/127 |

FOREIGN PATENTS OR APPLICATIONS 600,469   6/1960   Canada............................ 156/126

*Primary Examiner*—Clifton B. Cosby

[57] ABSTRACT

Apparatus for building pneumatic tires from rubber impregnated endless fabric bands requires precision positioning of the fabric bands on a rotating collapsible drum. An index means is provided for positioning the fabric bands on the collapsible drum. The index means comprises a light source capable of producing a light beam to be broken by edge portions of each fabric band when the fabric band is properly positioned on the drum, a light sensing means for detecting a break in said light beam by edge portions of each fabric band when the fabric band is properly positioned on the drum, and stopping means capable of being actuated by the sensing means and stopping rotation of the drum. Preferably, means are provided for automatically positioning the index means axially and radially relative to the end portions of the collapsible drum.

1 Claim, 4 Drawing Figures

SHEET 2

INDEX MEANS FOR TIRE-BUILDING APPARATUS

This is a continuation, of application Ser. No. 233,695, filed Mar. 10, 1972 now abandoned.

FIELD OF THE INVENTION

This invention relates to apparatus for building pneumatic tires and more particularly for building tires from rubber impregnated fabric bands.

BACKGROUND OF THE INVENTION

One way of building pneumatic tires is to first make endless ply bands of tire cords embedded in rubber and juxtapose the bands in the shape of the tire carcass. The band making and the tire building are done with separate apparatus, and both procedures have been developed to a high order. Exemplary of the art are believed to be the disclosures in U.S. Pat. Nos. 1,732,759, 2,409,974 and 3,405,023.

In such tire building apparatus a rubber impregnated endless fabric band is mounted over a collapsible rotating drum with the edge portions of the band overhanging the end portions of the drum. Bead setting mechanisms and stitching mechanisms are automatically positioned adjacent the end portions of the collapsible drum. The stitching mechanism causes the edge portions of the band to be folded over the end portions of the drum. The bead setting mechanisms then press bead rings into the folded end portions of the band causing the edge portions to be folded axially along the interior circumferential surface of the bead rings. The stitching mechanisms thereafter fold the edge portions outwardly over the outer surface of the bead ring and back over the surface of the band.

Additional bands are then positioned over the first band following the same steps of operation as above described, except for setting the bead rings, to complete the forming of the tire carcass. The tire tread is normally applied to the carcass by similar operations. The tire carcass and tread is then removed from the tire building apparatus at this stage by collapsing the drum and removing the same over one end portion of the drum. The tread pattern is thereafter applied to the tire by other devices such as the standard tire mold.

A critical feature in building pneumatic tires with such apparatus is the positioning of the rubber impregnated fabric bands on the collapsible drum. This has been done heretofore manually by the operator. The bands were sufficiently long to allow for the variations resulting from human error. The problem, however, was that such positioning resulted in waste of band material, and more importantly, non-uniformity in the external dimension and internal strengths of the tire.

The present invention eliminates these difficulties and disadvantages. It provides for the automatic and precise positioning of the bands over the drum so that uniform pneumatic tires result. In addition, it permits the length of the bands to be of optimum size so that the waste inherent in the use of longer bands is eliminated.

SUMMARY OF THE INVENTION

Apparatus is provided for building pneumatic tires from rubber impregnated tire cord plies in the form of endless bands. The apparatus has a rotatable, collapsible drum for supporting the fabric bands during the tire building which has at least one freely accessible end portion. Bead setting mechanisms are provided axially adjacent the end portions of the drum to press bead rings circumferentially into the edge portions of the fabric bands. Stitching mechanisms are also provided adjacent the end portions of the drum for folding the edge portions of the bands over the end portions of the drum and around the bead rings. Additional fabric bands are thereafter applied in juxtaposition over the first band and their edge portions folded over the encapsulated bead ring, until the tire carcass is built. The drum is then collapsed and the tire removed over the accessible end of the drum.

Index means are provided for precise positioning of the rubber impregnated ply bands over the drum and any previously processed bands. The index means is positioned adjacent the end portion of the collapsible drum opposite the freely accessible end portion thereof. The index means comprises a light source capable of producing a light beam to be broken by edge portions of the fabric band when the band is properly positioned on the drum; and a light sensing means, e.g. a photoelectric cell, for detecting a break in said light beam by edge portions of each fabric band when the band is properly positioned on the drum, and thereupon actuating means for stopping rotation of the drum.

Preferably the index means is automatically positioned, e.g. on an electrical signal from a computer, both axially and radially relative to the collapsible drum. Typically such positioning will be done by separate means for positioning (i) axially and (ii) radially. The radial positioning is preferably done by a double acting fluid cylinder or single acting fluid cylinder acting against a mechanical bias. The radial positioning means need only have extended and retracted positions. The axial positioning means, on the other hand must variously position the index means for each band ply of the tire during its building. Preferably, for convenience, the axial positioning means is the same means which automatically positions the stitching mechanisms.

In operation, a rubber impregnated endless ply band is started manually over an accessible end portion of the drum, and the drum rotated to progress the band across the outer circumference of the drum. The fabric band progresses across the band until its edge portions overhang the opposite end portion of the drum and break the light beam of the index means. The index means hence actuates a stopping means which stops the rotation of the drum. The fabric band is thus properly positioned on the drum for forming of the tire beads at each end portion of the collapsible drum.

Other details, objects and advantages of the invention will become apparent as the following description of a present preferred embodiment proceeds.

BRIEF DESCRIPTION OF THE DRAWINGS

In the accompanying drawings, the present preferred embodiment of the invention and the present preferred method of practicing the invention is illustrated in which.

DESCRIPTION OF THE PREFERRED EMBODIMENTS

Figure 1:
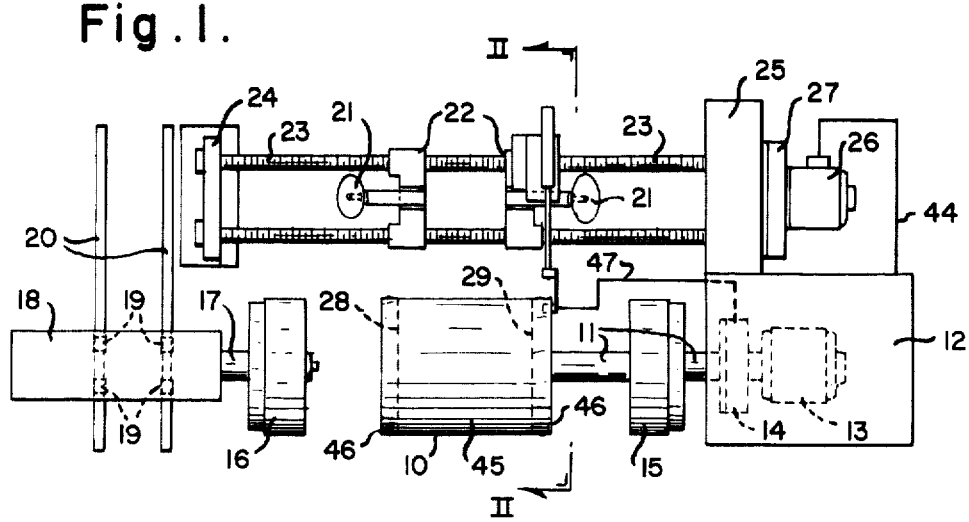
FIG. 1 is a top view of a tire building machine embodying the present invention.
Figure 4:
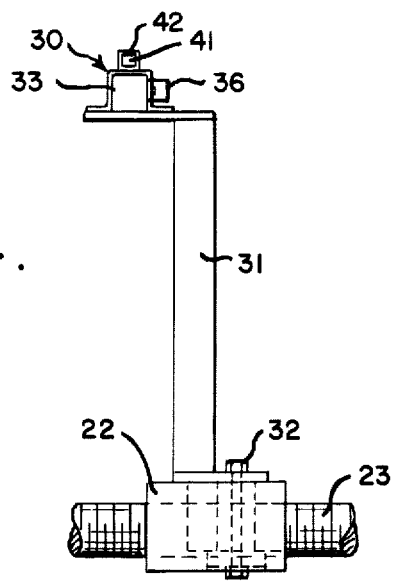
FIG. 4 is a fragmentary view in elevation taken along line IV—IV of FIG. 2.
Figure 2:
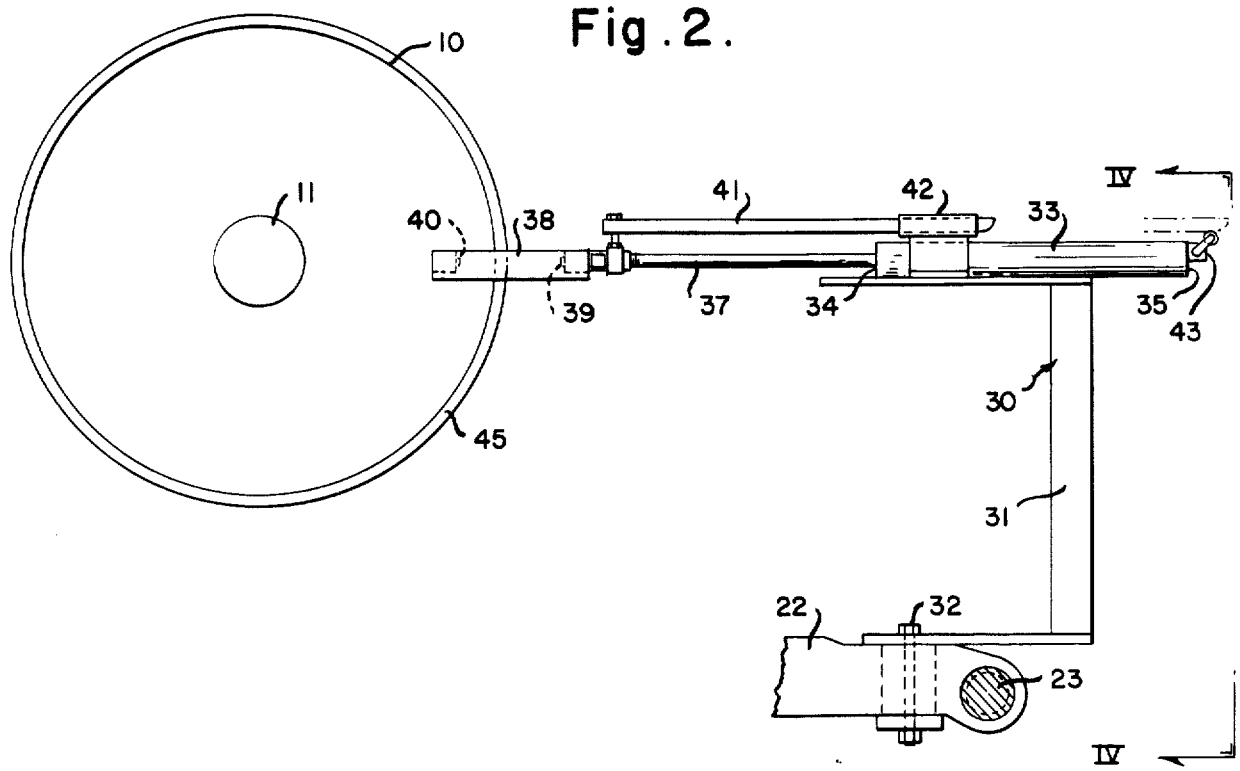
FIG. 2 is a partial cross-sectional view taken along line II—II of FIG. 1.
Figure 3:
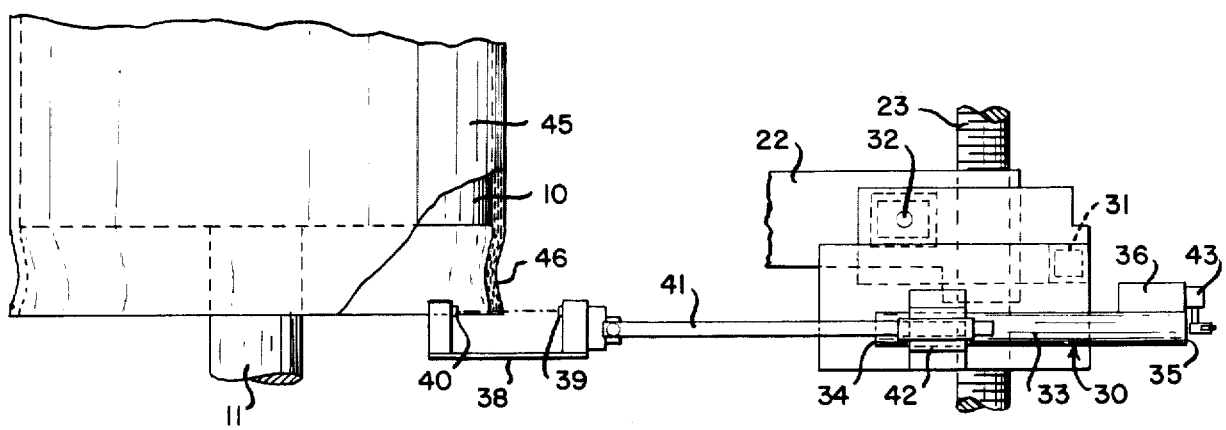
FIG. 3 is a partial top view corresponding to FIG. 2.

Referring to the drawings, a conventional apparatus is provided for building pneumatic tires by juxtaposition of rubber impregnated endless cylindrical fabric bands. A conventional collapsible drum is provided to permit removal of a tire or tire carcass after it has been built thereon. The drum 10 is mounted on shaft 11 which is carried by support housing 12. Shaft 11 is driven by an electric motor 13, positioned within support housing 12, through brake-clutch assembly 14 to rotate drum 10.

Disposed axially on opposite sides of collapsible drum 10 are bead setting mechanisms 15 and 16 for pressing bead rings into the edge portions of the bands. Bead setting mechanisms 15 and 16 are identical and operate simultaneously. However, bead setting mechanism 15 is slidably mounted on shaft 11, and bead setting mechanism 16 is mounted on shaft 17. Shaft 17 is in turn supported by carriage mount 18 which is carried by rollers 19 on rails 20. By this arrangement, carriage mount 18 and bead setting mechanism 16 can be moved perpendicular to the axis of drum 10 so that mechanism 16 is out of the way to permit access and positioning of bands on drum 10 and removal of tires or tire carcasses from drum 10.

Also associated with such tire building machines are stitching mechanisms for folding edge portions of the bands over the end portions of drum 10 and over bead rings. Such stitching mechanisms may be combined with bead setting mechanisms 15 and 16 as shown in U.S. Pat. No. 2,409,974. Preferably, however, the stitching mechanisms 21 are spaced away adjacent drum 10 and mounted on movable mountings 22. The mountings 22 are carried on worm gears 23 which are supported by support frames 24 and 25. Support frame 25 also supports reversible electric motor 26 and gear drive 27 to simultaneously drive worm gears 23 and in turn position movable mountings 22 axially relative to end portions 28 and 29 of drum 10.

Also mounted on movable mountings 22 is index means 30 of the present improvement. Index means 30 is mounted by bracket 31 and fastening means 32 to one of mountings 22 opposite the end portions 28 of drum 10 to which free access is provided. Index means 30 comprises an air cylinder housing 33 fastened to bracket 31 by suitable means. The air cylinder housing 33 has an open end portion 34 and a closed portion 35, and has a standard air cylinder (not shown) positioned therein. Slidably received through open end portion 34 of cylinder housing 33 and attached to the air cylinder is cylinder rod 37. The air is supplied to the cylinder housing 33 through valve means 36, positioned adjacent closed end portions 35, urging the cylinder against a mechanical bias means (not shown) and moving cylinder rod 37 along the interior of housing 33 and through the open end portion 34.

Positioned at the end of cylinder rod 37 is a U-shaped index housing 38. Index housing 38 supports a light source 39 and a light sensing means 40, e.g. a photoelectric cell, which are aligned on opposite legs of the U-shaped housing. The spacing between the legs of the housing is sufficiently wide to accomodate operation of the light sensing means 40 by all of the several band plies which are positioned over drum 10 during the tire building operation. In this way, the index means 30 may be operated by simply having two radial positions, namely an extended and a retracted position.

Also attached to the same end of cylinder 37 is support rod 41. Support rod 41 is slidably mounted in rod frame 42. By this arrangement, the index housing 38 is firmly supported in extended position as shown. Also a limit switch 43 is provided at the closed end portion 35 of cylinder housing 33 which is pivotally mounted and connected with valve means 46 so that when the index housing 38 is retracted support rod 41 trips limit switch 43 and actuates valve means 36 to reset the index means 30 for the next extension cycle.

The sequence of operations performed by the tire building machine are preferably controlled by a computer. Such a computer could be separately housed in proximity to the apparatus or possibly housed in support housing 12. The reversible motor 26 supported by frame 25 is actuated through electrical leads 44 to position mountings 22 and in turn index means 30 axially relative to edge portion 29 of drum 10 so that the resulting spacing corresponds to the desired overhang of edge portions for each specific band when the band is properly positioned on drum 10. Index means 30 is then positioned radially by the injection of air into cylinder housing 33 through valve means 36 to extended cylinder rod 37 and index housing 38 to their operative position.

Bead setting means mechanism 16 and carriage 18 are positioned to one side either manually or automatically to provide for free access by the operator to end portion 28 of drum 10. The edge 46 of a rubber impregnated fabric band 45 is then manually started over the end portion 28; drum 10 is started to rotate; and band 45 progressively rolled onto drum 10. Usually this operation is aided by the operator blowing air with an air hose (or "air wand") between the inside of the band 45 and the end portion 28 of drum 10.

Edge portion 46 of the band progresses across drum 10 until it breaks the light beam from light source 39 to light sensing means 40. Sensing means 40 then electrically signals through electric lead 47 to actuate brake-clutch assembly 14 and stop the rotation of drum 10. Band 45 is thus properly centered on drum 10 with its edge portions 46 overhanging end portions 28 and 29 thereof. It should be noted that the light beam from light source 39 to sensing means 40 may be oblique to end portion 29 of drum 10. For best results however, it is preferred that the light beam be following a radial path relative to drum 10 perpendicular to the axis thereof at the place where the light beam is broken by edge portion 46 of band 45.

After band 45 has been positioned on the drum, index means 30 is retracted by exhausting air through valve means 36 until limit switch 43 is actuated. Edge portions 46 of band 45 are then folded down against the end portions 28 and 29 of drum 10 by the stitching mechanisms 21. If the stitching mechanisms were in combination with bead setting mechanism 15 and 16, the folding operation would be done by simultaneously folding the band edges throughout their circumferences. However, when stitching mechanism 21 is mounted on mountings 22 as shown, the folding operation is done by stitching discs which engage and fold the band edge portions 46 as drum 10 is rotated.

After the band edges have been folded down against the end portions 28 and 29, a bead setting ring is pressed against edge portion 46 overlying the end portions 28 and 29 of the drum. The bead setting rings are positioned in the bead setting mechanisms 15 and 16. Bead setting mechanisms 15 and 16 are then brought in contact with the end portions 29 and 28 of drum 10, respectively, (i) by sliding mechanism 15 along shaft 11 and (ii) by positioning shaft 17 in axial relation with drum 10 and extending shaft 17 to interlock with shaft 11 at end portion 28 of drum 10. By the press of the bead setting mechanisms, edge portions 46 of the band 45 extending inwardly of the bead rings are folded axially across the inter-circumferential surface of the bead rings. Bead setting mechanisms 15 and 16 are then retracted. And the stitching mechanisms 21 actuated to fold the bead edges outwardly over the outer surface of the bead rings and back over the band's outer surface.

Additional rubber impregnated bands are then positioned over band 45 by following the same series of operations except for the setting of the bead rings. In each instance, the dimensions of the band vary either by virtue of being made differently or being stretched differently. Accordingly, index means 30 must be repositioned axially relative to the end portions 29 of drum 10 for each band so that the band is automatically properly positioned on the drum. The band edges of the later bands are processed by simply folding them over the encapsulated bead rings in each instance.

While the presently preferred embodiments of the invention have been specifically described, it is distinctly understood that the invention may be otherwise variously embodied and used within the scope of the following claims.

What is claimed is:

1. In an apparatus for building pneumatic tires by juxtaposition of rubber impregnated, endless fabric carcass bands which apparatus comprises a collapsible rotatable cylindrical drum for supporting the carcass bands during the tire building, said drum having a first accessible band applying end portion and a second end portion opposite said first end portion, a bead setting mechanism positioned axially adjacent said end portion of the drum for pressing bead rings circumferentially into opposite edge portions of said carcass bands, and a stitching mechanism adjacent said drum for folding edge portions of the carcass bands over the end portions of the drum and the bead rings, the improvement comprising:

A. an index means disposed adjacent said second end portion of the drum for accurately positioning each carcass band applied to the collapsible drum; said index means adapted to move
  1. along an axis substantially parallel to the axis of said drum and
  2. along a path transverse to said axis of said drum between an inoperative retracted position and an operative extended position, said index means comprising
    a. a light source capable of producing a light beam to be broken by edge portions of each carcass band extending a predetermined distance axially beyond said second end portion of said drum when said index means is in its extended position and
    b. a light sensing means for detecting a break in said light beam by edge portions of each carcass band extending a predetermined distance axially beyond said second end portion of said drum when said index means is in its extended position;
B. stopping means adapted for actuation by said light sensing means to stop rotation of the drum when said light sensing means detects a break in said light beam;
C. first means for the automatic and incremental movement of the index means axially of the drum by motive means according to a set of preset stop limits; and
D. second means for automatic movement of the index means transversely of said drum according to a set of preset stop limits.

* * * * *